United States Patent [19]

Chatterjea et al.

[11] 4,287,813
[45] Sep. 8, 1981

[54] TWO-STAGE CONCENTRIC HYDRAULIC BRAKE BOOSTER

[75] Inventors: Probir K. Chatterjea, Mt. Prospect; Daniel B. Shore, Niles, both of Ill.

[73] Assignee: International Harvester Company, Chicago, Ill.

[21] Appl. No.: 105,692

[22] Filed: Dec. 20, 1979

[51] Int. Cl.³ .................... F15B 13/042; F15B 13/14
[52] U.S. Cl. ........................................ 91/434; 60/553; 60/554; 91/461; 137/625.6
[58] Field of Search .................... 60/552, 553, 554; 91/434, 461; 137/625.6

[56] References Cited

U.S. PATENT DOCUMENTS 4,015,619  4/1977  Shore et al. .................. 137/625.6 X Primary Examiner—Gerald A. Michalsky
Attorney, Agent, or Firm—John W. Gaines; Ronald C. Kamp; F. David AuBuchon

[57] ABSTRACT

Booster providing both hydraulic feed-back and hydraulic feel-back in a two-stage operation in which we boost-brake a vehicle. Concentric, nesting, inner and outer control parts include, as the sliding outer part, a brake-pedal-connected input signal spool or sleeve for developing a desired signal pressure varying linearly along the length of, and therefore according to the sliding position of, the sleeve; the inner part constitutes a captive, telescoping metering spool with its ends in corresponding ends of the spool sleeve. At one end, the metering spool is given the desired signal as a first stage pressure to respond to; the spool's response constitutes the second stage, by metering an actual pressure and applying it at the other end of the spool sleeve and spool, whereby hydraulic feed-back comes on in the second stage at actual pressure to responsively control the other end of the metering spool, and whereby hydraulic feel-back in the second stage comes on at the same actual pressure to exert itself on the other end of the spool sleeve and therefore react against the brake pedal.

12 Claims, 5 Drawing Figures

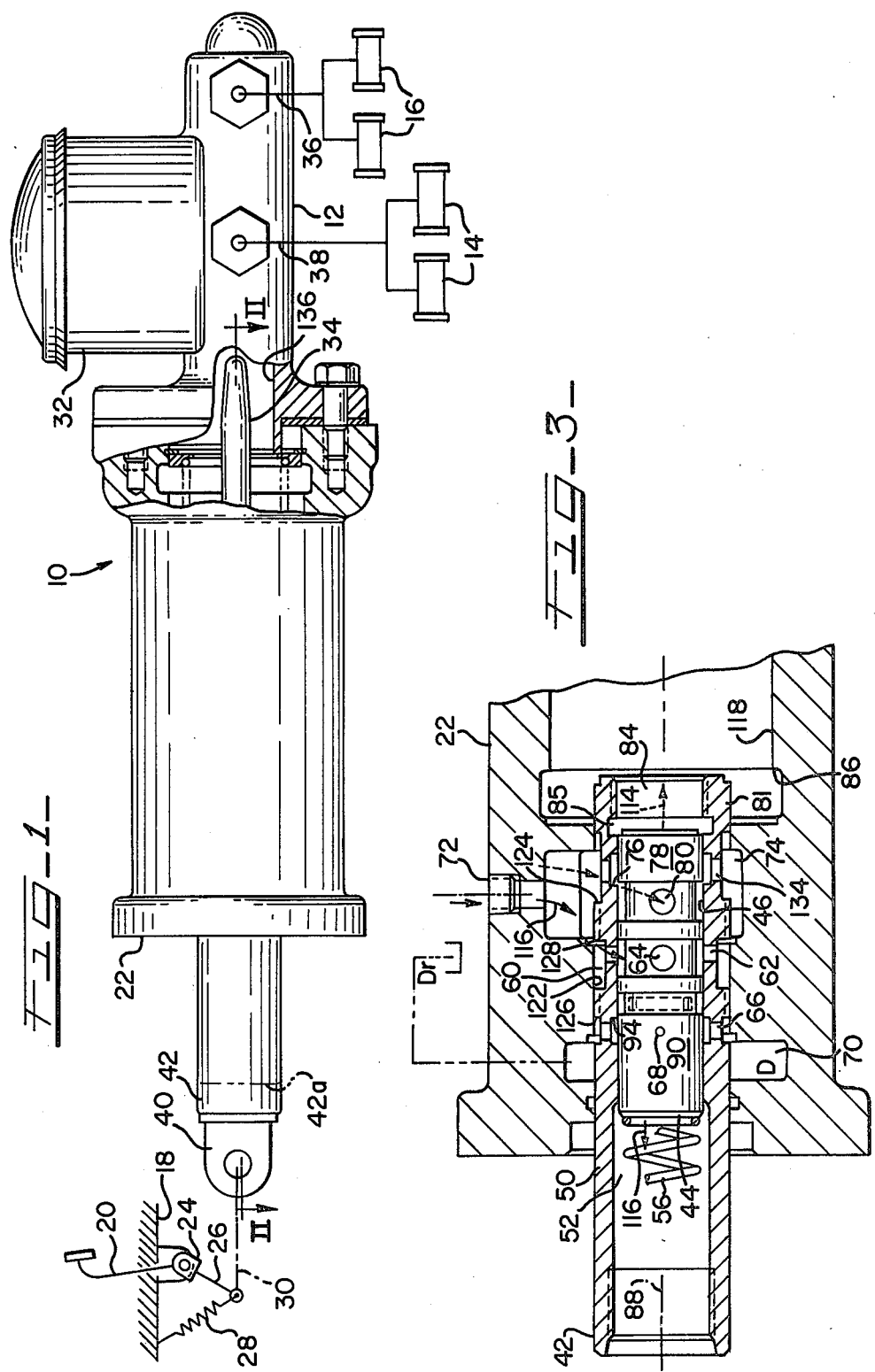

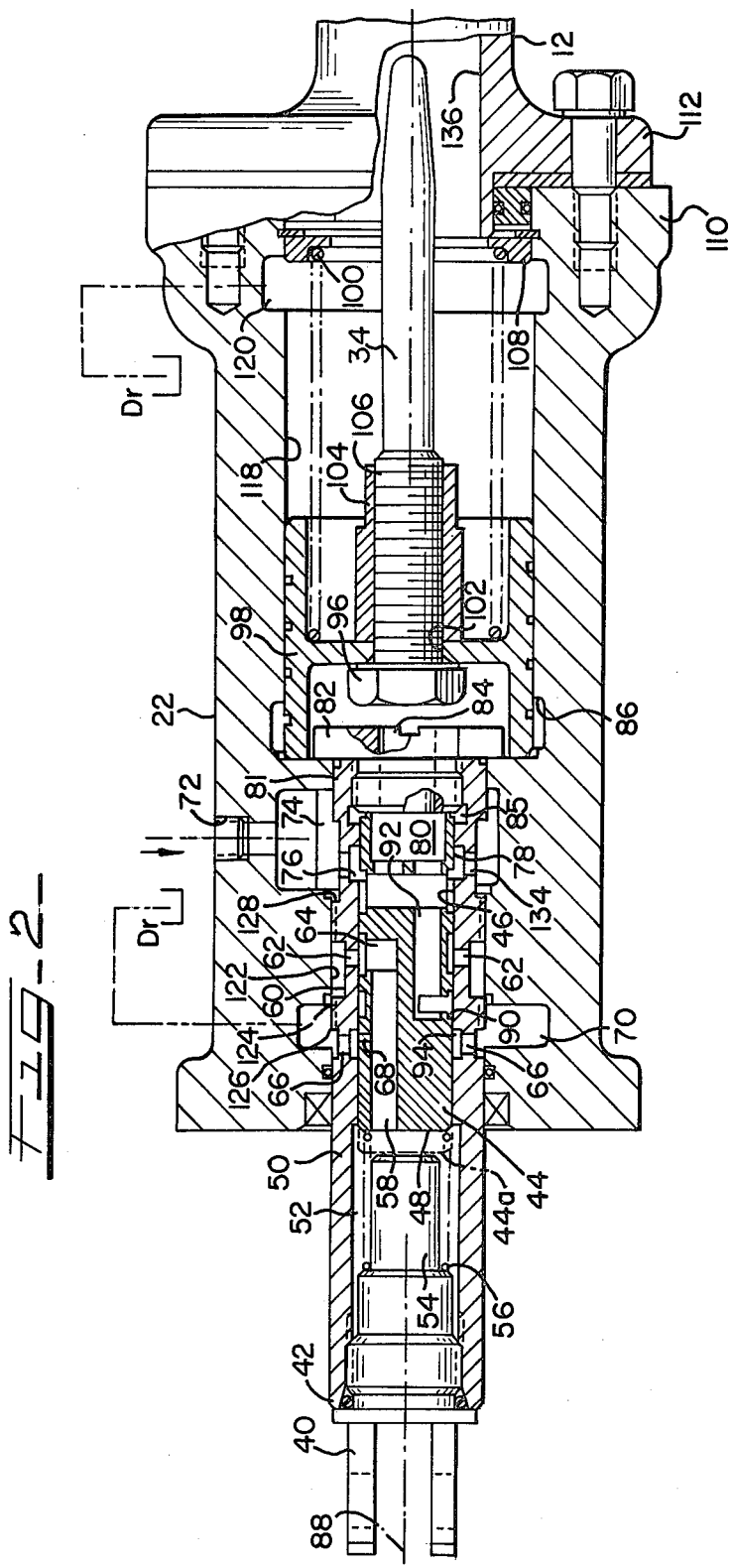

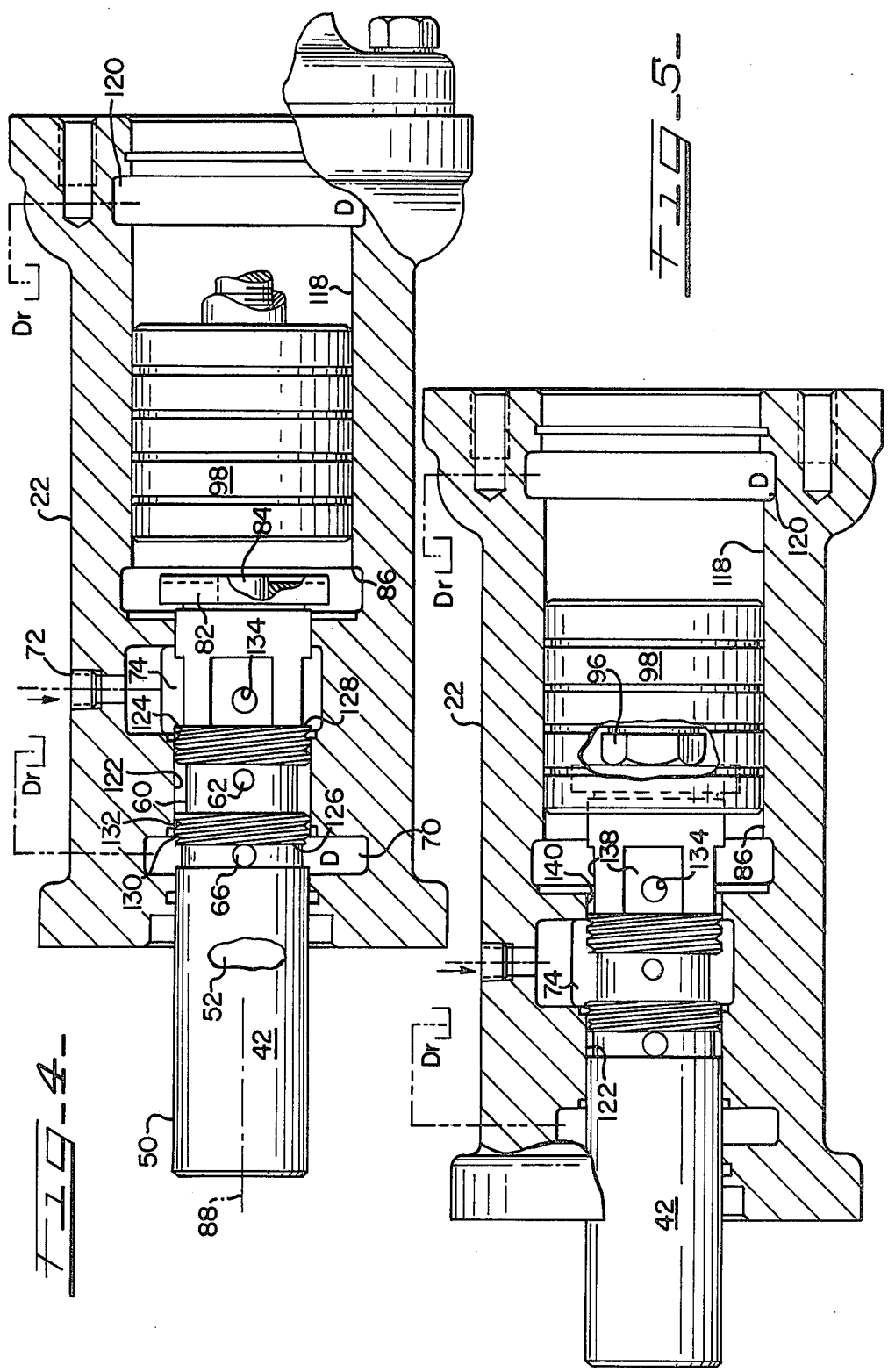

TWO-STAGE CONCENTRIC HYDRAULIC BRAKE BOOSTER

This application is a companion case to Chatterjea U.S. Ser. No. 010,568, filed Feb. 9, 1979, to Chatterjea U.S. Ser. No. 951,690, filed Oct. 16, 1978, now abandoned, and also to Chatterjea U.S. Pat. No. 4,164,276, all owned by the same assignee.

Our invention provides both hydraulic feed-back and hydraulic feel-back in a two-stage operation in which we boost-brake a vehicle. Concentric, nesting, inner and outer control parts include, as the sliding outer part, a brakepedal-connected input signal spool sleeve for developing a desired signal pressure varying linearly along the length, and therefore according to the sliding position, of the sleeve; the inner part constitutes a captive, telescoping metering spool with its ends in corresponding ends of the spool sleeve. At one end, the metering spool is given the desired signal as a first stage pilot or reference pressure to respond to; the spool responds by metering an actual pressure and applying it at the other end of the spool sleeve and spool, whereby hydraulic feed-back comes on in a second stage at actual pressure to responsively control the other end of the metering spool, and whereby hydraulic feelback in the second stage comes on at the same actual pressure to exert itself on the other end of the spool sleeve and therefore react against the brake pedal.

Background patents include, but are not limited to, U.S. Pat. Nos. 2,130,799, 3,411,414, 3,677,362, 4,087,972, 2,447,920, 3,018,041, 3,460,577, 3,677,362, 3,693,503, 2,974,639, 2,984,213, and particularly U.S. Pat. Nos. 2,873,724, 3,661,054, 4,156,348 and 4,069,843.

A feature of novelty hereof resides in our method of applying a precisely set boost cylinder pressure for hydraulic feel-back control, and applying the same precisely set boost cylinder pressure as metering feed-back control, which in turn results from the hydropotentiometer method we have to apply a precisely set signal as input pressure to the metering spool, which in turn results from pedal action which, when precisely moved, causes the hydropotentiometer pressure signal to vary precisely linearly at all points of pedal movement. In other words, each parameter is exactly matched in magnitude to pedal position, no matter how minimal overall pedal travel is designed for or how incremental are each of the adjustments made within the overall travel of the pedal concerned.

As a matter of fact, it is an object of our invention to provide, in operator-actuated booster brakes, a metering control requiring in the first stage only a minimal stroke of the actuator and affording hydraulic follow-up thereto in the second stage by a pressure-centered response of the control.

Other objects in our boost braking are to produce a pressure intensifier or multiplication action of several magnitudes and to cause the actuator motion to be hydraulically multiplied or amplified by several times as measured at the output.

Our braking process in the accomplishment of the above comprises the improved steps of: hydropotentiometrically generating a first stage precise pressure as a desired input pressure signal; meteringly generating an inlet-outlet flow pumped to or exhausted from the boost cylinder chamber until a spring-loaded piston therein resets in accommodating at a second stage to, and thereby establishing, the changed actual cylinder pressure resulting; applying the input signal as developed during the first stage to the end of the metering spool adjacent the corresponding pedal-connected end of the signal spool; and applying actual pressure as developed during the second stage, first, as hydraulic feed-back signal to the other end of the metering spool as a matched counterforce to the input signal for precise metering and, second, as a matched hydraulic feel-back signal to the corresponding adjacent other end of the signal spool as counterforce to the pedal to provide precise hydraulic feel. This precision positioning process conserves pump output pressure and flow remarkably well, limited in essence to two trickles; signal generation by hydropotentiometer is primarily a potential or pressure level tap-off operation relying upon insignificant, constant flow, and the satisfied metering condition established affords make-up flow for leakage, and no more.

Further features, objects and advantages will either be specifically pointed out or become apparent when, for a better understanding of the invention, reference is made to the following description, taken in conjunction with the accompanying drawings which show a preferred embodiment thereof, and in which:

FIG. 1 is a longitudinal view, in left side elevation, of a pedal-operated dual hydraulic braking system having an interposed hydropotentiometrically set and meteringly set hydraulic booster embodying the present invention;

FIG. 2 is a top plan sectional view taken along the section line II—II in FIG. 1, showing all parts sectioned including a signal input sleeve for the first stage operation of hydropotentiometrically setting desired pressure and a pressure-centered spool for the second stage operation of meteringly setting actual pressure;

FIG. 3 is a like showing to FIG. 2, but differing therefrom by presenting only an external view of the pressure-centered spool, and in a different position from the one shown theretofore; and FIGS. 4 and 5 appear as like showings to FIG. 3, but differing therefrom by presenting only an external view of the signal input sleeve, and in positions differing from the ones shown theretofore;

More particularly in FIG. 1 of the drawings, an hydraulic booster brake system 10 is shown including a conventional dual braking cylinder 12 connected separately to the front wheel brake cylinders 14 and to the rear wheel brake cylinders 16 of a vehicle 18 such as a rubber tire loader. The dual cylinder 12 responds indirectly to an operator input pedal 20, through the intermediary of a two-stage concentric brake booster 22, for supplying the wheel cylinders 14 and 16 with hydraulic brake fluid under pressure to establish brake drag as desired on the vehicle wheels, not shown, or to cause them to stop.

In more specific detail in the foot brake mechanism, establishing the master brake setting and master boost pressure setting, the pedal 20 forms one of the arms of a bell crank 24 secured on a fixed pivot to the operator's platform of the vehicle 18. A depending bell crank arm 26 is controlled at its outer end by an anchored brake return spring 28 and controls a rearwardly extending push link 30.

The dual braking cylinder 12 carries the usual capped fluid reservoir 32 on top, and is activated at its inner end by a plunger or thrust probe 34. The probe 34 projects into the cylinder 12 to thrust against standard tandem connected hydraulic master cylinder pistons, not shown, the leading one of which supplies one separate hydraulic line 36 for the rear wheel cylinders 16 and the trailing one of which supplies another separate hydraulic brake line 38 supplying the cylinders 14 on the vehicle front wheels, not shown. All fluid in the circuit from the reservoir 32 to the wheel cylinders is in a self contained independent hydraulic brake system.

The cleivs-connected push link 30 operates the booster 22 ordinarily under motion amplification and hydraulic force amplification at the forward end of the cylinder of booster 22 so as to cause, at the rear end, the braking operation through the power piston-connected probe 34. More particularly, a clevis 40 to which the link 30 is pivotally connected is threaded solidly into and is carried by an input signal spool or sleeve 42 for retracting by pushing the sleeve into the cylinder 22 into various rearwardly depressed positions such as the position indicated by the broken lines 42a. The booster 22 is supplied with hydraulic motive fluid in a pressurized circuit separate from the independent system of the brake cylinder 12.

BOOSTER METERING—FIG. 2

The input signal sleeve 42 of booster 22 carries a concentrically telescoping captive metering or reducing or modulating spool 44 in the hollow interior 46 of the sleeve. At one end, a signal pressure movable end area 48 of the spool 44 received in the corresponding end portion 50 of sleeve 42 projects into a signal pressure chamber 52 of the latter. The spool 44 can slide to a position as shown by the broken lines 44a against a stop 54 on clevis 40 which is sealed fluid tight in the sleeve end portion 50 to plug the outer end of the signal pressure chamber 52. A very weak spool spring 56 seats on a shoulder of the stop 54 to constantly bias the metering spool fully open into the position as shown by the solid lines 44.

The metering spool 44 is drilled out sufficiently to be considered generally hollow and includes a long longitudinal signal passage 58. A dividing groove 60 on the signal sleeve 42 introduces signal pressure in a path leading through a set of hydropotentiometer pick off ports 62 in the sleeve, and an interconnecting spool groove and radial passage 64 in the spool, thence through the longitudinal spool passage 58 into the signal pressure chamber 52. A set of sleeve drain ports 66 radially disposed between inner and outer sleeve grooves intervenes between a bleed restriction 68 in the spool and a drain core 70 in the booster 22 so as to allow a slow bleed-off of signal pressure from the passage 58 and pressure chamber 52. Core 70 is marked with a D to indicate an appropriate connection of the core to drain Dr.

An hydraulic inlet port 72 in the coring of the booster 22 has external connections, not shown, rendering the port a source of supply of hydraulic fluid pressure regulated at a typical pressure of 2400 kPa (350 psi). Inlet fluid from the port 72 flows internally into a main pressure core 74 whence it enters through a set of radial flow ports into an internal annular groove 76 in the hollow sleeve interior 46.

When the spool occupies the referred to valve-open position as shown by the solid lines 44, an inlet land 78 thereon uncovers the left metering edge of the internal groove 76 thereby introducing the main pressure. At their second end, the spool 44 has a chamber 80 to receive the main pressure and projects into the corresponding end section 81 of the sleeve 42. The latter threadably carries a plug 82 hollowed so as to internally longitudinally define an inlet-outlet 84 communicating the spool chamber 80 and a cored, sleeve feed-back chamber 85 to a variable volume piston cylinder chamber 86.

The light spring 56 previously described acts when there is no pressure in the system and is a homing spring simply for keeping the spool 44 from floating out of its open position just described; gravity would probably be just as effective in returning the spool 44 to bottom against the plug 82 if the booster 22 at its clevis end 40 were tilted upwardly, rendering the longitudinal axis 88 of the booster substantially vertical.

In contrast to the results of the open spool position described, the spool has a position exhausting fluid from the chamber 86, inlet-outlet 84, feed-back chamber 85, and chamber 80, by reason of an escape path afforded to drain Dr when the spool occupies its exhausting position as shown by the broken lines 44a; in that position, the spool outlet land 90, which has a longitudinal passage intercommunication 92 to the spool chamber 80, uncovers the right metering edge of an annular internal groove 94 in the sleeve which discharges the fluid at drain pressure D through the set of drain ports 66, drain core 70, thence into the drain Dr.

The piston-connected thrust probe 34 presenting a bolt head 96 at its driven end, is hydraulically reciprocated in the piston-cylinder chamber 86 under control of an externally-grooved power piston 98 and a strong, piston return spring 100. The recessed face of the piston 98 has a sealed aperture 102 receiving the driven end of the probe 34, and a nut 104 opposite to the probe bolt head 96 clamps the piston face therebetween and is tightly threaded onto an intermediate section 106 of the probe 34. A seat 108 for the return spring 100 is lodged in the attachment end 110 of the casing of booster 22.

The booster attachment end 110 receives the attaching flange 112 of the dual braking cylinder 12 which is gasketed and bolted thereto; one master cylinder found suitable for the latter use is Bendix brake assembly part 2233700, for example.

PRESSURE-CENTERED METERING—FIG. 3

The spool 44 has intermediate positions such as the satisfied metering position as illustrated in this figure where it is dynamically pressure-centered.

The pressure-centered spool, in the practical application illustrated for that very reason, does not have a precisely geometrically centered position relative to the sleeve internal grooves 76 and 94. The flow under main pressure through the booster inlet port 72 follows the path shown by the broken line arrows 114 so that, progressing from the main pressure core 74 in the path, the spool inlet land 78 just barely uncovers the left edge of the sleeve internal groove 76 so as slowly and constantly to meter inlet flow into the spool chamber 80; while at the same time the spool outlet land 90 just barely completely covers the sleeve internal groove 94 so as to block off the spool connection to the drain core 70 which is indicated to be at drain pressure D.

As a result, because of the practical considerations for leakage, the slight amount of escaping fluid in the system is constantly being replenished because of the supplementing effect afforded by the cracked-open position of the land 78. In order to stabilize itself in this steady state or satisfied condition, the spool 44 will theretofore have introduced or exhausted fluid to or from the variable volume piston cylinder chamber 86 in a second stage, piston moving operation completed only at the point at which the piston stops. At that point, the actual pressure in the chamber 86 will have achieved the desired matching pressure level, exerting itself in two ways.

First, the actual pressure developed at that point will be applied as an hydraulic feed-back signal at the end of the land 78 on the metering spool 44, as a matched counterforce, to the input signal or reference pressure being exerted in chamber 52 and in the pedal-connected end portion 50 of the sleeve 42. Also under all other conditions as well, the function of constant feed-back at the end of valve land 78 is to keep the output signal, which produces the feed-back, referenced at all times to the pressure level of the input or reference signal. Second, the actual pressure in the feelback or variable volume chamber 86 is applied as a matched hydraulic feelback signal to the adjacent exposed end of the sleeve 42 as counterforce to the operator's foot effort being transmitted through the pedal-connected end portion 50 of the signal sleeve.

FIG. 3 makes it clear, from inspection, that all lands on the spool 44 including inlet land 78 and outlet land 90 are of uniform diameter, constant from end to end of the spool. It follows, then, that pressure set at the first stage in the signal pressure chamber 52 by way of the hydropotentiometer pick off ports 62 is exactly matched in the second stage of hydraulic follow-up operation by the feedback pressure from the feed-back chamber 85 exerted on spool 44. And because the feed-back pressure and the feel-back pressure on the sleeve 42 match one another, it follows that the feel-back pressure exerted on sleeve end section 81 in the second stage of follow-up operation exactly matches the pressure of signal pressure chamber 52. Because of the magnitude of the brake boosting pressures exerted in booster 22, the nominal exertion of the spool spring 56 can as a practical matter be ignored in the force computations, the same as the alternative previously mentioned of relying on the force of gravity which would be an equivalency to the spring 56.

Fluid ultimately exerting its pressure in the signal pressure chamber 52 follows the path of the solid line arrows 116 which, at the intermediate point, can be seen to pass through the hydropotentiometer pick off ports 62.

Any leakage past the piston 98 in its receiving cylinder bore 118 is as shown in FIG. 2, accumulated in a drain core 120 of the booster casing and returned therefrom to a drain Dr, all at drain pressure D.

HYDROPOTENTIOMETER PRESSURE TAP-OFF—FIG. 4

The casing of booster 22 has a cavity bore 122 between and communicating with each of the main pressure core 74 and the drain core 70. A so called hydropotentiometer section 124 of the sleeve 42 received in the cavity bore 122 includes the groove 60 which divides the section into first 126 and second 128 lands, respectively (left and right lands as viewed in FIG. 4). The section 124 on the outside of its left and right lands 126, 128 is formed with two narrow shallow grooves 130 and 132 having a complimentary arrangement 180° out of phase with one another, and cooperating with the bore 122 covering the double helix grooves so as to form, as a long hydraulic restriction, a double helix orifice along the length of the section 124.

The narrow, shallow formation passes only meager flow, a trickle being all that is necessary. The section 124 is illustrated in FIG. 4 in a mid-position to provide essentially mid-power pressure for the booster 22. Pressure changes are easy.

It can be seen that with movement of the signal sleeve 42 to the left for example, as viewed in FIG. 4, as each double helix groove or fraction thereof additionally becomes engaged between land 128 and the bore 122, a commensurate groove or fraction thereof on the left land 126 is disengaging from the cavity bore 122. So the effective length of the double helix orifice between main pressure at 74 and drain pressure at 70 stays constant and the linear rate of pressure drop along the effective length of the orifice stays constant. Also, the trickle flow passed stays constant. But the tapped off pressure in dividing groove 60 commensurately changes (lowers) as the groove 60 physically approaches the drain cavity core 70, and therefore pressure entering radially inwardly through the hydropotentiometer pick-off ports 62 in the sleeve 42 undergoes an identical change (lowers same amount).

With movement of the signal sleeve 42 in either direction along the axis 88, it will be appreciated that the pressure tapped off the hydropotentiometer section 124 will vary linearly with movement, all the way at and between the low pressure of drain core 70 and the high pressure of main pressure core 74 in the casing of booster 22. The advantage is that the desired signal pressure in the chamber 52 within sleeve end portion 50, as established by the hydropotentiometer pick-off ports 62, is always linearly matched in magnitude to the precise positional movement of signal sleeve 42. Therefore, the matching feed-back and feel-back pressures in and around the inlet-outlet 84 hydraulically follow-up in the second stage so as always to precisely correspond to the exact positional movement of the signal sleeve 42; the inlet-out 84 serves as a continuation of the feed-back chamber 85.

A set of radial flow ports 134 in sleeve 42 provides the inward connection for flow between the main pressure core 74 and the previously described sleeve internal groove 76, not shown, and its cooperating spool inlet land 78, not shown.

PEDAL RELEASE—FIGS. 1 and 2

The booster 22 and dual braking cylinder 12, so as to take the relative positions illustrated, are preassembled and adjusted in conventional manner such that the probe 34 is slightly out of contact with the plunger cup in the more adjacent one of the two tandem-connected dual brake pistons, not shown.

Internally, as shown in FIG. 2, the first land 126 at the left as viewed in that figure, is just barely out of contact with the cavity bore 122, enabling the hydropotentiometer pickoff ports 62 and dividing groove 60 to directly communicate with the drain core 70 which is at the drain pressure D. So the signal pressure chamber 52 will be held at drain pressure D and, because of the attempted flow through the inlet port 72, the spool 44 will move toward its broken line position 44a from the fully open position as shown by the solid lines 44 so as to assume an intermediate metering position, not shown. In such intermediate metering position of the spool 44, its inlet land 78 barely uncovers the internal groove 76, causing a practically complete pressure drop from the main pressure, whereas the internal drain groove 94 is comparatively more uncovered by the outlet land 90 creating only a minor pressure drop toward drain pressure D.

Consequently, in the pedal release situation, the variable volume piston cylinder chamber 86 remains practically at drain pressure D as maintained by the minor flow being metered by the spool 44. The power piston 98 remains undisplaced.

In its operative function as a pressure intensifier as between the relatively lower pressure maintained in the chamber 86 and the intensified pressure simultaneously being maintained in the hydraulic brake line 36 and 38, the booster 22 as illustrated in FIGS. 1 and 2 multiplies the pressure by a factor of 3 or 4, for example. The designed multiplication factor depends upon the proportion of the cross sectional area of the power piston 98 to the piston cross sectional area in the dual braking cylinder 12, which mathematically bears the same ratio as the proportion of the square of the diameter of cylinder bore 118 to the square of the diameter of the brake piston bore 136 in the dual braking cylinder 12.

PEDAL DEPRESSION TO REACH FULL PRESSURE—FIG. 3

The pedal, not shown, calls for full hydraulic pressure when the signal sleeve 42 being depressed thereby first reaches the sleeve position as shown in solid lines in this figure. The second hydropotentiometer spool land 128, the one on the right as viewed in the figure, will have just cleared the end of the bore 122 thus enabling the full main pressure through the inlet port 72 to be established in the signal pressure chamber 52. Accordingly, the spool 44 will take the illustrated position earlier described, metering-in the slight flow necessary to make up for piston leakage and maintaining main pressure in the variable volume piston cylinder chamber 86.

The maximum intensified hydraulic pressure is simultaneously being maintained in the dual cylinder brake lines, not shown.

STRAIGHT THROUGH OPERATION—FIG. 5

A typical situation for this operation as illustrated occurs upon failure of hydraulic boost pressure. The natural tendency is for the operator to depress the brake pedal farther and farther. In that case, the hollow centered plug 82, not shown, carried by the threaded inner end section 81 of the sleeve 42 will, by considerably overtraveling, close up the space and come into solid metal to metal abutment against the probe bolt head 96. Thereupon, further continued depression of the sleeve 42, under the operator's foot pressure being exerted, will force the piston 98 to move and start pressurizing the cylinder 12 and its dual braking system lines, not shown. The dual braking will be by foot force, without hydraulic power assistance.

In another case, where the booster hydraulic pressure is below normal or the operator mistakenly thinks the system is not reacting completely, it is possible for the operator to cause the sleeve 42 to overtravel considerably and thus, by foot force, to establish the straight through operation and physically augment the hydraulic pressure already active in the variable volume piston cylinder chamber 86. FIG. 5 illustrates both cases without differentiation.

And, as therein illustrated, each of the radial flow ports 134 in the sleeve 42 has a flat 138 at the mouth machined in the cylindrical outer surface. Thus, the plug carrying inner end section 81 of the sleeve 42 does not block off the port 140 from the cavity bore 122, thereby avoiding what would be the unwanted stoppage of flow from the main pressure core 74 into the variable volume chamber 86.

NORMAL MODERATE OVERTRAVEL

There is, of course, no reason to limit the operator's foot travel during normal hydraulic operation under full boost pressure. So, at will of the operator, he can make the sleeve 42 and its plug 82 overtravel all the way to the bolt head 96 if he keeps depressing the brake pedal. However, once the signal sleeve 42 is depressed past its FIG. 3, full pressure position described, the boost pressure and hydraulic brake pressure hold constant at their normal maximum pressures, which pressures and the intensification are altered only at the point at which the plug 82 bottoms against the bolt head 96. From that point of depression, more overtravel forced by foot will physically augment the force of the boost pressure (which does not change) and increase only the hydraulic brake pressure.

MINIMUM MOVEMENT OF ACTUATOR

It is known in the vacuum brake art to provide for minimum movement of the actuator, as verified by U.S. Pat. No. 3,411,414. But during the hydraulic braking hereof, the full sleeve travel as illustrated in FIG. 3 for building to maximum hydraulic pressure is only slightly more than 1 cm, or slightly less than 0.5 in. The relative movement of spool 44 once it reaches metering position within the sleeve 42 is at most a few thousandths of an inch, or just several thousandths of a centimeter, as it follows up hydraulically so as to reference the actual pressure on cylinder volume 86 to the signal or desired pressure in the chamber 52. The application or exhaustion of fluid from the chamber 86 occurs during the second stage or follow up period, and the chamber 86 rapidly responds in its change in volume to that final volume achieved.

The motion amplification possible is something else. Specifically, the power piston 98 has a travel capability of over 5 cm. (2 in.)

Hence as illustrated, four-fold motion amplification, or five and greater is realized here.

Instances occur in the field when absolute linearity of response to the hydropotentiometer section 124 as shown in FIG. 3 is unnecessary in operating loaders if not undesireable. Many operators prefer under the lower brake pedal pressures and sometimes under the higher pressures which they generate to be able to smoothly feather vehicle brakes. Therefore, the relative inequality between the longitudinal lengths of the first and second lands 126 and 128 can be changed around and the size of the bleed restriction 68 can be changed to open it up more, with the result that pressure changes are much more gradual during initial and/or final sleeve movement, whereas the pressure change per unit movement caused by the hydropotentiometer section 124 in its mid-range become more abrupt or drastic compared to being purely linear.

As put in graphical terms with the ordinatal booster cylinder pressure plotted against abscissal signal sleeve travel so as to have true linear response appear in an operating curve form as a straight diagonal line with constant ascending or positive slope, what we can provide on basis of the mentioned, purely subjective preference of the operator, is a graphed operating response appearing as a lesser slope curve with positive rate of change at outset of pedal travel, then a much higher slope curve, nearly a straight line and practically straight up compared to the slope of the linear operation diagonal line, in mid-range of travel, and finally a curve with negative rate of change of slope and a lower slope than the linear diagonal line as compared at full effective pedal stroke. In summary, in the respective cases of the straight linear response line and the curved response line, one appears as a bend sinister or baton sinister and the other as S-shaped. In either case, pedal overtravel past full effective stroke will appear as a flat horizontal operating line because it will produce no further change of boost pressure, as earlier emphasized. These selections of land length inequalities and bleed opening sizes are more simply made by varying the present uniform depth of the dual grooves 130 and 132 (FIG. 4), and the individual taste and feel of typical operators who object to continuous linearity can still be adequately catered to.

Another design variable allowing for departure as desired from strict linearity of response is the leakage to drain affordable through the fit of the left or first hydropotentiometer land 126. A stringently tight fit of the land 126 in its receiving bore 122 is not always essential, and toleration specified in the design for a looser sliding fit can be useful and, in cases wanting lesser linearity, can prove desirable.

The present concentric short stroke control has a telescoping arrangement affording an obvious advantage in length compactness as compared to the end-to-end or tandem spool arrangement which we provide in a common bore according to FIG. 6 of the drawings in our companion U.S. Pat. No. 4,015,619.

The double helix hereof is grooved into the exterior of the hydropotentiometer section first and second lands with the two helical grooves identical and with uniform groove depth, uniform groove size, and uniform helix angle so that the resulting orifice which each helix forms with the closing surface of the valve bore has an equal and constant rate of pressure drop along its length after the standard manner of accurate hydropotentiometers. So when precise linearity of response is called for, this invention can provide it.

Variations within the spirit and scope of the invention described are equally comprehended by the foregoing description.

What is claimed is:

1. For use in hydraulically supplied, brake booster mechanism, disposed between brake pedal actuated means (40) and a power piston (98) thereof, actuatable by the metered hydraulic output of an actual fluid pressure:
an interposed, concentric, hydraulic boost control (22) comprising telescoping, generally hollow parts one within another, one (44) metering the hydraulic output of an actual fluid pressure developed from high and low pressure means of communication thereto;
the other part (42) comprising a signal pressure sleeve mechanically secured to the brake pedal actuated means and having means (66, 134) of communicating the high and low pressure to the one metering part.

2. For use in an hydraulically supplied pressure system including hydraulic high pressure, low pressure, and inlet-outlet passages, signal-pressure setting valving means provided with:
a bore (122) therein hydraulically disposed for communicating with said passages and controllably connecting the high (74) and low (70) pressure passages for producing an actual inlet-outlet pressure in the inlet-outlet passage (84) in correspondence with a signal pressure as set; and
a concentric, two-stage hydraulic boost control (22) in the bore comprising telescoping, generally hollow parts one within another, one (44) metering into the inlet-outlet passage (84) the hydraulic output of a second stage, actual fluid pressure and being pressure-centered by opposed pressure movable end surfaces thereon adjacent corresponding end portions of the other part;
the other part (42) comprising a hydropotentiometer spool (124) secured to manual setting means (40) for varying the position in said bore of the spool therein while it operatively communicates with the high and low pressure passages in the bore, said spool effectively establishing and communicating a first stage, signal pressure to one (50) of its end portions and to the corresponding adjacent pressure movable end surface (48) on the one part, and being of elongated shape (126, 128) so as to finely vary the signal pressure established thereby between the high and low pressure passage aforesaid in precise incremental conformity with the master setting.

3. For use in hydraulically supplied, brake booster mechanism, disposed between brake pedal actuated means (40) and a dual braking system probe (34) thereof:
an interposed, concentric, two-stage hydraulic boost control (22) comprising telescoping, generally hollow parts one within another, one (44) metering the hydraulic output of a second stage, actual fluid pressure and being pressure centered by first and second (48, 78) pressure movable surfaces, the second of which surfaces on the one part being exposed to the actual output pressure;
the other part (42) mechanically secured to the brake pedal actuated means (40) for longitudinal movement precisely coordinated at all times therewith, said other part having means of communicating (62) to the first (48) of the pressure movable surfaces of the one part a first stage desired pressure signal varying linearly along the length (126, 128) of said other part so as to afford a constant pressure change according to the longitudinal position of the other part.

4. The invention of claim 3, characterized by:
said one part (44) being a captive part within, but independently longitudinally movable relative to, the hollow other part (42).

5. The invention of claim 3, characterized by:
the other part (42) of the control defining a restriction, and being relatively groovingly (130, 132) relieved with respect to a relatively movable companion surface (122) and elongated (126, 128) so as to form the restriction as a hydropotentiometer orifice of appreciably elongated length;
said means of communicating (48, 58, 124, 122, 62) comprising means of applying hydropotentiometer pressure as the aforesaid first stage desired pressure signal from an infinity of tapping points at incrementally different, set levels of precise pressure along the elongated length of the hydropotentiometer orifice.

6. The invention of claim 3, characterized by:
means comprising the first and second pressure movable surfaces (48, 78) opposing one another, whereby the first and second stage pressures respectively acting thereagainst center the one part (44) in a metering position (FIG. 3) in the control where it references the second stage actual signal at all times to the pressure level of the first stage signal.

7. For use in hydraulically supplied, brake booster mechanism (10), and in use between brake pedal actuated means (40) and a dual braking system probe (34) thereof:
an interposed, concentric, two-stage hydraulic boost control (22) comprising an outer, input signal sleeve (42), and an independently movable captive metering spool (44) carried in the hollow interior (46) therof and dividing that interior into a signal pressure chamber (52) in one sleeve end and into a feed-back chamber (84) at an opposite, feel-back end (82) of the sleeve;
said sleeve mechanically secured at said one end (50) thereof to the brake pedal actuated means (40), and at said opposite, feel-back end (82) confronting the dual braking system probe (34) for straight through braking operation longitudinally;
said metering spool (44) metering the hydraulic output of a second stage, actual fluid pressure and being pressure centered by an opposed first end (48) thereof received in said signal pressure chamber (52) and by a second end (78) thereof, said feed-back chamber (84) and feel-back end (82) of the sleeve jointly having the actual output pressure communicated thereto by the metering spool, and said feed-back chamber (94) receiving therein the second end (78) of the latter whereby actual output pressure is likewise communicated thereto by the metering spool;
said input signal sleeve (42) having means (60, 62, 64) of communicating jointly to the signal pressure chamber (52) and first end (48) of the metering spool a first stage desired pressure signal varying linearly along the length (126, 128) of said sleeve so as to afford a constant pressure change according to the longitudinal position of the sleeve.

8. The invention of claim 7, characterized by:
an hydraulic piston (98) drivingly connected to the probe (34), said piston likewise confronting said feelback end (82) of the sleeve and likewise having the actual hydraulic output pressure communicated thereto by the metering spool (44), whereby the piston (98) receives hydraulic driving power and the sleeve (42) receives hydraulic feel-back, jointly from the hydraulic output.

9. For use in an hydraulic system (10) providing a pressure outlet (84) regulated thereby according to a master pressure setting (20) and including high (74) and low (70) pressure hydraulic conduits:
valve assembly means (22) with a main bore (122) therein hydraulically disposed for communicating with said conduits;
means forming, along a signal input sleeve (42) slidably received in said main bore, a restricted orifice path (130, 132) of appreciable length (126, 128) for the flow of hydraulic fluid through the orifice from one end portion to another so as to fix the pressure differential therealong between high and low;
a captive metering spool (44) slidably received in the hollow interior (46) of the sleeve (42) adapted to produce an output under pressure between high and low, and dividing said hollow interior so as to define a sleeve signal pressure chamber (52) receiving an end (48) of the spool presenting a pressure sensitive end area for regulating the spool (44) therewith;
master setting means (20) to which the sleeve is mechanically secured (40) for relatively longitudinally adjusting the position of the sleeve and spool in the main bore;
means to communicate the metering spool (44), through the hollow interior (46), sleeve (42), and main bore (122), with the high and low pressure conduits (74, 70) so as to adapt the spool (44) to produce its output under the described pressure between high (74) and low (70);
means of communicating (46, 80) said output under pressure to and through said regulated pressure outlet (84); and
a pressure setting take-off (62) making a connection from a point, on the restricted orifice (130, 132) longitudinally adjustable in correspondence with the master setting, jointly to the sleeve signal pressure chamber (52) and to the pressure sensitive end area (48) of the metering spool received therein to afford a pressure output regulated according to the master pressure setting (20).

10. For use in an hydraulically supplied, pressure system (10) including hydraulic high pressure, low pressure, and inlet-outlet (84) passages:
signal-pressure setting valving means (22) with a bore (122) therein hydraulically disposed for communicating with said passages and controllably connecting the high and low pressure passages (70, 74) for producing an actual inlet-outlet pressure in the inlet-outlet passage 84 in correspondence with a signal pressure as set;
said valving means (22) comprising an assembly in said bore (122) of independently slidable, hydropotentiometer and satisifed metering spools (42, 44) for establishing the signal and actual pressures, said satisfied-metering spool (44) communicating at its opposing ends (48, 78) respectively with the signal pressure in the bore and with the actual pressure in such way that the established pressure on a body (52) of hydraulic fluid maintained by the spools at one end (48, 50) is the signal pressure;
said spools having at the opposite end (78, 82) the aforesaid inlet-outlet (84) exposing both of them to inlet-outlet passage end pressure, and disposed within confines of one (42) and under control of the other (44);
said hydropotentiometer spool (42) being of an elongated shape (126, 128) so as to vary the signal pressure established in the bore thereby between the high and low pressure passages from a maximum to a minimum at successive points linearly proportionately along its length;
the spools (42, 44) of said assembly telescopically assembled with the hydropotentiometer spool the outer one in contact with the bore and the satisfied-metering spool disposed inwardly, a captive internally of the external one, said satisfied-metering spool (44) controlling the inlet-outlet passage (84) and varying, in said passage, said actual pressure established by modulation thereby between the high and low pressure passages aforesaid; and manual means (40) to which the hydropotentiometer spool (42) is secured and by which it is positioned for precisely setting signal pressure in the bore to a desired value, said satisfied-metering spool (44) reaching a satisfied position when the force on said one end (48) of the spool exposed to signal pressure set in the bore by the hydropotentiometer spool is balanced by the force on the opposite end (78) as aforesaid exposed to the actual pressure controlled thereby in the inlet-outlet passage (84).

11. For use in an hydraulic system (10) providing a pressure outlet (84) regulated thereby according to a master pressure setting (20) and including high (74) and low (70) pressure hydraulic conduits:

valve assembly means (22) with a bore (122) therein hydraulically disposed for communicating with said conduits;

a signal input sleeve (42) in said bore having a double spool portion (126, 128), said sleeve further having means forming a restricted orifice path (130, 132) of flow of hydraulic fluid through the orifice from one end portion (126) to another (128) so as to fix the pressure differential therealong between high and low, said restricted orifice formed of appreciable length, formed along the double spools, and covered by companion sections (122) of the bore;

a captive metering spool (44) in and dividing the interior (46) of the sleeve so as to define therewith a sleeve signal pressure chamber (52);

a pressure setting take-off (62) in the sleeve and spool connected between the sleeve signal pressure chamber (52) and a communication point on the double spool portion (60) which intervenes so as to divide the double spools and to divide the restricted orifice into two oppositely extending sections (126, 128) maintaining the pressure gradient from high to low;

master setting means (20) to which the sleeve is secured (40) for precisely adjusting the take-off and resulting master pressure setting by relatively longitudinally adjusting the position of the sleeve (42) and spool (44) in the bore;

means (90, 78) to communicate the metering spool, through the interior (46), sleeve (42), and bore (122), with the high and low pressure conduits (74, 70) to produce an output under pressure between high and low; and means of communicating (46, 80) said output under pressure to and through said regulated pressure outlet (84), said metering spool (44) in its dividing position presenting to the sleeve signal pressure chamber (52) an adjacent, pressure sensitive, spool end area (48) in consequent communication with the master setting pressure to afford pressure output regulated thereby according to the master pressure setting (20).

12. Method of operating a working piston and cylinder hydraulic control system in which the cylinder chamber's volume (86) is enlarged or reduced by movement of a spring-loaded piston (98) therein, and in which the control comprises input signal and metering spools (42, 44) nested concentrically one within another each with the ends adjacent the other's corresponding ends, the input signal spool having a pedal-connected end (50) and the metering spool providing metered inlet-outlet flow communicating with the hydraulic fluid volume (86) in the cylinder chamber, said method comprising the improved steps of:

hydropotentiometrically generating a first stage precise pressure as a desired input pressure signal;

meteringly generating an inlet-outlet flow (84) applied to or exhausted from the cylinder chamber (86) until the spring-loaded piston resets in accommodating at a second stage, thereby establishing the changed actual cylinder pressure resulting;

applying the input signal as precisely developed during the first stage to an end (48) of the metering spool adjacent the corresponding pedal-connected end of the signal spool; and applying actual cylinder pressure as developed during the second stage, first, as hydraulic feed-back signal to the other end (78) of the metering spool as a matched counterforce to the input signal for precise metering and, second, as a matched hydraulic feel-back signal to the corresponding adjacent other end (82) of the signal spool (42) as counterforce to the pedal (20) to provide precise hydraulic feel.

* * * * *